Aug. 19, 1952     J. RAZEK     2,607,830
METHOD AND APPARATUS FOR MEASURING MOISTURE
CONTENT OF SAND OR THE LIKE
Filed May 28, 1947     7 Sheets-Sheet 1

Fig. 1

INVENTOR.
JOSEPH RAZEK
BY

Aug. 19, 1952   J. RAZEK   2,607,830
METHOD AND APPARATUS FOR MEASURING MOISTURE
CONTENT OF SAND OR THE LIKE
Filed May 28, 1947   7 Sheets-Sheet 2

Fig. 2

INVENTOR.
JOSEPH RAZEK
BY

Aug. 19, 1952 J. RAZEK 2,607,830
METHOD AND APPARATUS FOR MEASURING MOISTURE
CONTENT OF SAND OR THE LIKE
Filed May 28, 1947 7 Sheets-Sheet 5

Fig. 8

INVENTOR.
JOSEPH RAZEK

Fig. 10

Patented Aug. 19, 1952

2,607,830

UNITED STATES PATENT OFFICE 2,607,830

METHOD AND APPARATUS FOR MEASURING MOISTURE CONTENT OF SAND OR THE LIKE

Joseph Razek, Llanerch, Pa., assignor to Chain Belt Company, Milwaukee, Wis., a corporation of Wisconsin Application May 28, 1947, Serial No. 750,986

23 Claims. (Cl. 175—183)

1

This invention relates to methods and apparatus for the measurement of the moisture content of granular material, particularly sand and other mineral aggregates used as ingredients in hydraulic cement concrete, and combinations of granular material, such as hydraulic cement concrete.

It is well known that the water content of a cement concrete mixture has a profound effect on the strength and durability of the product after hardening. In fact, for a given material the relationship between strength and quantity of water is so well defined that strengths may be expressed mathematically as a function of the ratio of the quantity of water to the quantity of cement in the mix.

The problem of measuring with accuracy the amount of water introduced into a concrete mixture is an exceedingly difficult one, and heretofore it has defied a practical solution.

The water in a concrete batch comes from three sources, namely: surface moisture introduced with the sand or other fine aggregates; surface moisture introduced with the gravel or other coarse aggregates; and free water measured directly into the batch. The water introduced as surface moisture may vary greatly from batch to batch and may amount, frequently, to as much as 50% of the total requirements. In order for the amount of water which should be measured directly to be known, it is necessary that the amount of surface moisture in the aggregates be determined or, alternatively, the total water in the concrete, from the three sources, measured.

The determination of the moisture content of the sand is perhaps the most critical, for it may vary greatly from day to day depending upon conditions of rain, dry weather, cloudy and sunny days, etc. A pile of sand may be substantially air dry on the surface and quite wet interiorly so that successive batches removed from the supply may contain very different quantities of moisture.

The condition just indicated makes quite impractical the determination of moisture content by local sampling. Batching plants are frequently required to handle upwards of fifteen hundred pounds of sand per minute in order that they may feed at a consistent rate the concrete mixers receiving their discharge. This rate of feed through the batching and weighing plant must be coordinated, if the feed is to a central plant mixer, with the desired output of the mixer, which is ordinarily of the order of one batch per minute.

2

If the batcher is feeding the concrete making ingredients into truck mixers, which mix the batches during transit to the job site, or into trucks which merely haul the aggregates to a mixer located at the job site, the feed must keep pace with the rate at which the trucks can be loaded, and frequently this is also a very rapid operation, with successive trucks being loaded every minute or so, and each load comprising upwards of a cubic yard or more total ingredients including anywhere from 1,500 lbs. to 6,000 lbs. of sand, depending on the size of the transporting body.

All concrete mixers, both stationary central plant mixers and transit mixers, are equipped with very accurate means for determining the amount of water, and specifications frequently require that such means measure to an accuracy of plus or minus one pint of water per cubic yard of concrete produced. The folly of these rigid specifications will be apparent when it is realized that the water content of the sand and coarse aggregates, which heretofore has been incapable of accurate determination, may vary many times this amount and yet be subject to practically no control. In fact, it is not uncommon for some batches of these aggregates to contain so much moisture prior to mixing that even small additions of water will make the resulting concrete altogether too wet to meet any reasonable strength requirements. When this occurs it is impossible to rectify the damage as regards that mixed batch.

The operator of the plant who is trying to produce good concrete will endeavor to determine by sampling or otherwise the approximate moisture content of the first aggregates which are batched, and after the concrete is mixed therefrom will try to determine what corrections should be made for subsequent batches, based on the "slump" of the concrete that has been produced; but his methods are at best haphazard because there is available today no accurate tool by which the moisture content of the aggregates can be determined in advance of mixing.

Various proposals have been made for the measurement of the moisture content of sand (or of other granular materials entering into concrete) but generally speaking these methods have been so inaccurate as to be far from meeting the requirements which the concrete designers want, namely an allowable tolerance of plus or minus one pint of water per cubic yard of concrete. Electrical resistivity can be a satisfactory index of moisture content only if the packing of the sand is uniform and if the moisture is uniformly distributed through the sand. If, as is usual, the distribution of moisture is not uniform, veins of dry sand may give unusually high resistance values even though intermediate portions of the sand may be quite wet. The variation of resistance with moisture, furthermore, is extremely non-linear and while this situation alone would not preclude resistivity measurements if other conditions were satisfactory, extreme non-linearity generally requires substantial complication and monitoring of measuring apparatus.

The measurement of dielectric constant also would seem to offer a possibility for determination of moisture content. Dielectric measurements are quite sensitive in discriminating between dry sand and wet sand, but once the free moisture content rises to a value of 1 or 2% the sensitivity of measurement of purely dielectric constant becomes rather small, possibly due to the fact that in the electrical configuration the sand becomes as a whole so conductive that a layer of sand between condenser plates functions as a third metallic plate with consequent insufficient change in the reaction of the measuring device as the moisture content rises beyond the percentages just indicated.

In accordance with the present invention measurement depends upon the dielectric properties, either dielectric losses or a combination of dielectric losses and dielectric constant. The apparatus in accordance with the invention may be considered a low power dielectric heating installation in which the sand passes between condenser plates and constitutes a variable load which is measured. It has been found by experiment that the power absorption by the sand, affecting the measuring system, is such a function of the moisture content that it may be used for the accurate measurement of the moisture content.

The broad object of the present invention is the measurement of moisture content of sand or similar granular material in a fashion which may be practically applied in the handling of large quantities of the material. For simplicity of description sand will be specifically referred to as the material undergoing measurement, but it will be apparent that other granular materials may have their moisture contents similarly measured and in particular this is true of all the aggregates entering into concrete mixes.

More specifically the present invention provides a method and apparatus for the continuous measurement of the moisture content of a granular material in such fashion that the material may be progressed in a stream past the measuring apparatus in the progress from the supply to use. The apparatus gives a time integral of the moisture content, corrected, as will be fully explained hereafter, for variations in density so that the total moisture content of a batch of the material may be directly read from the apparatus. In making up the mix thereafter and with accurate knowledge of the total moisture of the entire batch of material to be used, proper allowance may be made for the water content carried by the material itself and thus there may be produced by additions of predetermined amounts of water mixes of accurately known compositions.

The foregoing and other objects of the invention particularly relating to details of methods and apparatus will become apparent from the following description read in conjunction with the accompanying drawings in which:

Before proceeding with a description of the mechanical parts of the apparatus, reference will be made to Figure 1 for a general discussion of the electrical measuring means to illustrate the principles involved. A conventional crystal controlled oscillator is indicated generally at 2 and comprises a vacuum tube 4 and crystal 6 together with their usual connections. This oscillator may operate at various frequencies and the results obtained are dependent very little upon the frequency used so long as it is sufficiently high to involve substantial variations in load occasioned by variations in moisture content of the sand. An oscillator operating at 7 megacycles has been found highly satisfactory, but substantially equally satisfactory results can be obtained with frequencies ranging from 100 kilocycles to 15 megacycles.

The output of the oscillator is amplified by a conventional amplifier indicated at 8 provided with a tuned circuit 10 inductively coupled to a coaxial transmission line 12 which may conduct the high frequency amplified output to a remote apparatus through which the sand passes. The output of the cable is inductively coupled to the circuit comprising a coil 14 shunted by a variable condenser 16 and a loading arrangement which includes plates 18 and 20 between which there passes the belt 22 carrying the sand 24, the moisture content of which is to be measured.

The loading device is essentially in the nature of a dielectric heating installation having variable power absorption depending upon the moisture content of the sand. The power absorption may be measured in terms of a potential appearing across the plates 18 and 20 and to accomplish this end there is provided a diode 26 with its anode 28 joined to the plate 18 and its cathode grounded through a condenser 30. Rectified direct current is taken off through the line 32 connected to the cathode through a meter 34 and potentiometer 36 to ground. The meter 34 may be calibrated in terms of moisture content of the sand passing the plates 18 and 20. The instantaneous measurement of moisture content is not of major significance but is of interest for checking purposes, in particular to ascertain whether the sand does not contain so high a moisture content as to make invalid the ultimately measured results.

The circuit comprising the coil 14, condenser 16 and the sand load is adjusted for resonance at a frequency higher than the oscillator frequency. Accordingly, an increase in moisture content gives an increase in current through the diode rectifier.

The ungrounded end of the potentiometer 36 is connected to the anode of a diode 38 constituted by joining together the grid and plate of one triode of a double triode tube. A variable contact 42 on the potentiometer 36 is connected to the grid of the other triode 40 of the same tube. The common cathode of the triodes 38 and 40 is connected to ground through a resistor 44 shunted by a condenser. The anode of the triode 40 has a positive potential applied thereto from a terminal 46 through a resistance 48. To the anode of the triode 40 there are connected the anodes of a pair of triode elements in a tube 54 through resistances 50 and 52. The common cathode 56 in the tube 54 is connected to the common cathode of the triodes 38 and 40. As will be evident from the connections indicated an increase of current through the diode 26 will result in a rise of potential of the cathode 56. Part of this rise is due to flow of current through the diode-connected triode 38. Another part of this rise is due to flow of current through the triode 40 under control of its grid connected to the potentiometer contact. This latter triode is operated on a non-linear portion of its grid voltage-plate current characteristic so that there is produced a greater change in cathode potential during low moisture indications than during high moisture indications. As will be pointed out later in greater detail this effects compensation for the additional quantity of sand that will pass through the apparatus when the percentages of moisture are in the low portion of the measurable range.

The triodes of the tube 54 are connected in a conventional multivibrator oscillator circuit involving cross connections of the grids and anodes through condensers 58 and 60 and inclusion of resistances 62 and 64 in the grid leads as well as inclusion of the resistances 50 and 52 in the plate leads. A characteristic of this type of oscillator is that increased potential of the cathode 56 will result in decrease of frequency. The oscillator may be adjusted to a frequency of 60 cycles for sand which contains no free moisture, varying to a frequency of 45 cycles for sand containing 6% of free moisture. Obviously, other figures may be used but for a consistent picture these may be assumed.

The alternating output of the multivibrator is delivered through the condensers 66 and 68 to a conventional push-pull amplifier including the tubes 70 and 72, which amplifier delivers alternating current through the output transformer 74 at a voltage proper for driving the synchronous motor 76. A similar synchronous motor 78 is driven from the commercial alternating current supply lines 80 which may be assumed to be supplied with alternating current at 60 cycles.

The shafts of the motors 76 and 78, rotating in opposite directions, drive input bevel gears of a differential gear arrangement indicated at 82, the output shaft 84 of which drives a counter mechanism which may comprise an arm 86 directly connected to the shaft 84 and cooperating with a dial 88 for the measurement of fractional rotations of the shaft and a counter 90 also driven by the shaft but arranged to read in terms of integral rotations. It will, of course, be understood that the synchronous motors 76 and 78 which may be of clock type contain internal gearing to reduce the speed of their output shafts which may, for example, rotate at a rate of one revolution per second at 60 cycles.

The arrangement just described is such that if the multivibrator frequency is 60 cycles per second, corresponding to no free moisture in the sand, the output shaft 84 from the differential gearing will remain stationary. When, however, the frequency of the multivibrator drops, the shaft 84 will rotate so that its rotational displacement will be a time integral measurement of the difference between the standard 60 cycle frequency and the multivibrator frequency. This difference, in turn, is a function of the moisture content of the sand and as will be pointed out later the time integral which is registered will represent the total moisture content of the sand passing through the measuring apparatus during a period of operation.

Having now described the electrical measuring system attention will be given to the sand handling mechanism which provides for uniformity of conditions making possible accurate measurement. Figures 2 to 7, inclusive, show this mechanism.

Figure 2:
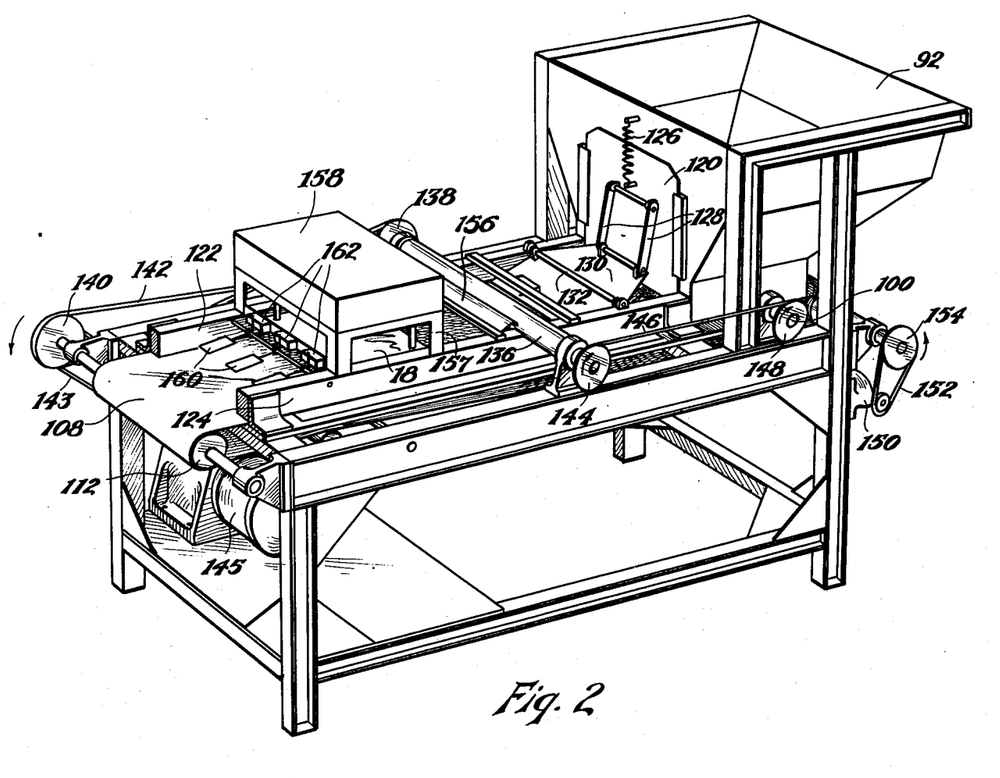
Figure 2 is a perspective view showing in particular the mechanical parts of a typical measuring apparatus.
Figure 7:
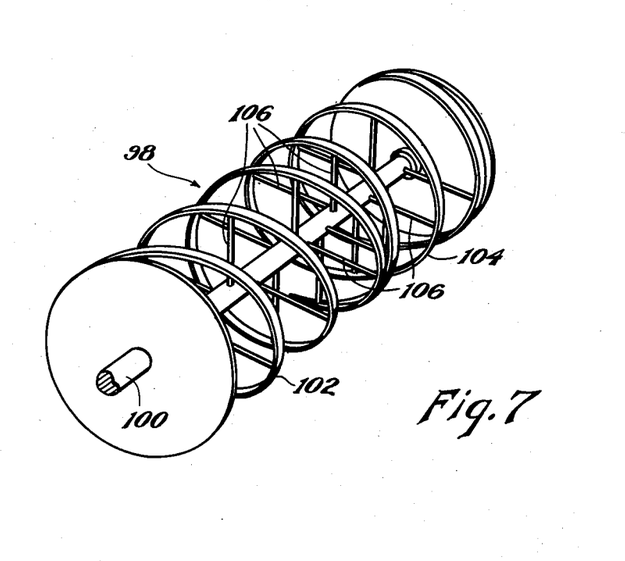
Figure 7 is a perspective view of a fluffing device used for the purpose of securing uniformity of the measuring apparatus.

A hopper 92 is arranged to receive sand from a supply and has converging lower walls 94 and 96 which deliver the sand to a fluffing rotor 98 illustrated particularly in Figure 7. This rotor comprises a shaft 100 which carries helices 102 and 104 of opposite hands on opposite sides of its center through suitable spokes 106. The helices 102 and 104 are formed of heavy metal strip. The object of this fluffing rotor is to break up agglomerates of the sand resulting from packing in the hopper so as to deliver the sand in a loose uniform condition to the conveyer belt 108 running beneath the hopper about pulleys 110 and 112 at opposite ends of the machine. Tension on the belt is provided by a roller 114 engaging its lower lap under the action of a weighted lever 116. The upper lap of the belt runs over a plate 118 carried in grounded fashion by the frame of the machine, the area of this plate 118 beneath the condenser plate 18 constituting the grounded plate 20 of the electrical system previously described.

Figure 3:
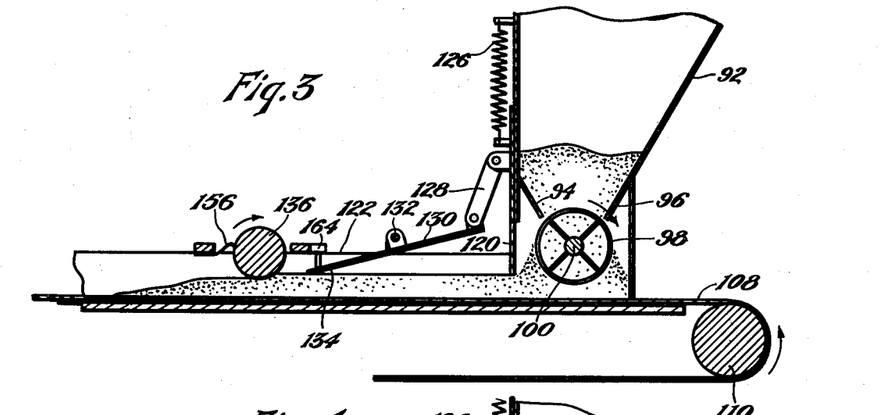
Figures 3, 4 and 5 are sectional diagrams through the apparatus illustrating in particular the control of feed of the material to provide uniformity of conditions for measuring purposes.
Figure 4:
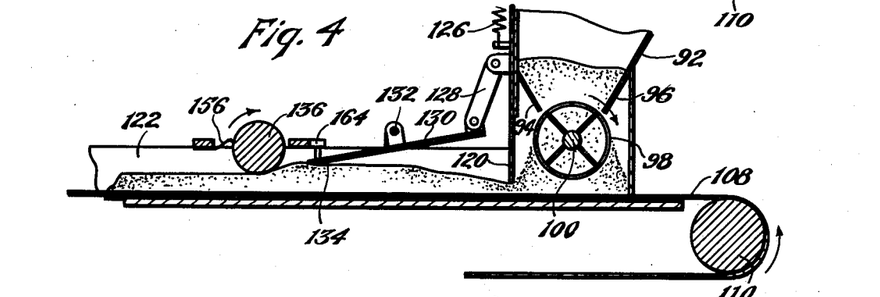
Figure 5:
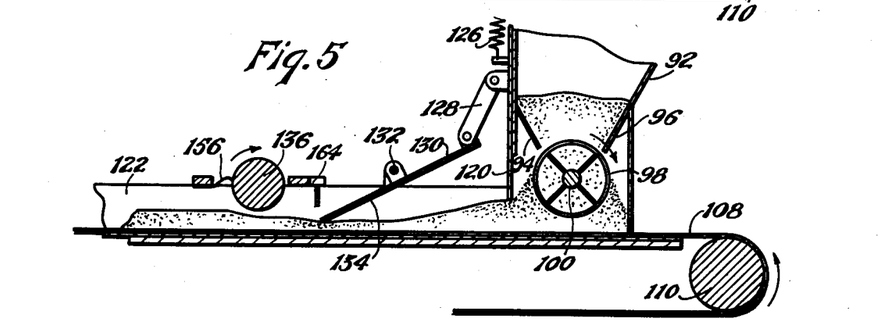

An opening of the hopper adjacent to the belt 108 is controlled by a sliding gate 120 moving between wall members 122 and 124 which extend along the length of the belt and confine the sand thereon. A spring 126 urges the gate 120 to upper open position. Links 128 connect the gate to a plate 130 pivoted at 132, the forward end 134 of which plate is arranged to engage the sand being advanced by the belt. Figures 3, 4 and 5 will make clear the automatic control of the gate for the purpose of maintaining a uniform depth of sand on the belt. The normal and proper feed of the sand takes place under the conditions indicated in Figure 3 in which case the lower edge of the gate 120 and the end 134 of the plate 130 are approximately at the same level so that a uniform depth of sand is carried by the belt. If for some reason the depth of sand increases, the plate 130 will have its end 134 raised tending to close the gate 120 and thus reduce the thickness of the layer of sand delivered from the hopper. On the other hand, if the thickness of the sand layer decreases, the end 134 of the plate 130 may drop resulting in wider opening of the gate. In actual operation the plate 134 and the gate may fluctuate slightly but on the average a uniform delivery of sand will take place, so that considering the uniformity of condition attained by the fluffing rotor there will be a substantially constant volumetric rate of delivery from the hopper.

Following passage of the sand beyond the end 134 of the plate 130 it is compacted by the operation of a metal roller 136, the shaft of which carries a pulley 138 driven by a belt 142 from a pulley 140 carried by the shaft of the belt pulley 112. This shaft is driven through a belt 143 from a driving motor 145. A pulley 144 on the shaft of the roller 136 drives through a belt 146 the pulley 148 on the shaft 100 of the fluffing rotor. Thus all of the parts of the mechanism are driven in definite speed relationship. The shaft of the rear belt pulley 110 carries a pulley 154 which, through a belt 152, drives a generator 150 serving as the source of alternating current for driving the synchronous motor 78. Normally the frequency of alternating current delivered by this generator will be 60 cycles as mentioned above.

The contacting roller 136 compresses the sand layer to a definite extent which improves the accuracy of the moisture measurements. A scraper 156 is provided to remove from the roller sand which may stick thereto.

Figure 6:
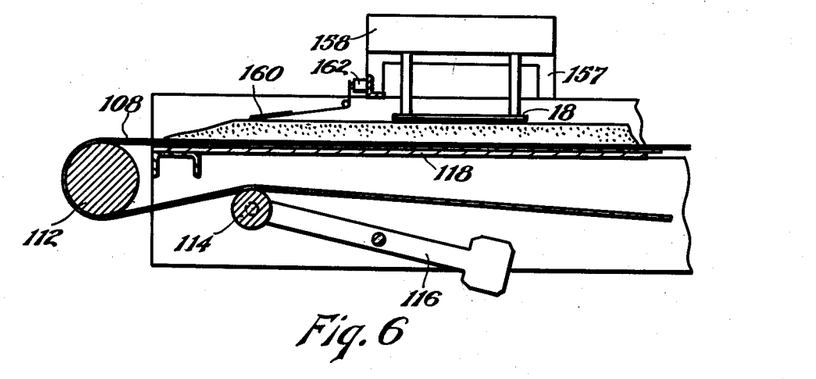
Figure 6 is a vertical section through the apparatus showing in particular the electrical measuring apparatus immediately associated with the material.

Beyond the roller 136 a frame 157 supports the plate 18 in suitable insulated fashion, this frame also carrying in an enclosed metal box 158 certain portions of the electrical system including, for example, the coil 14, condenser 16 and diode 26 so that delivered from this shielded enclosure there is only direct current with the result that the high frequency characteristics of the circuit cannot be adversely affeced by changes of external conditions except those due to the variable moisture content of the sand.

A series of feelers 160 engage the sand beyond the plate 18 so as to maintain closed individual switches 162 only when the height of the sand beyond the plate 18 is normal. A switch 164 is arranged to be closed only when the end 134 of the plate 130 is at or above its normal height. The switches 162 and 164 are connected in series and through a relay control the high voltage supply of the electrical system so that the latter will operate only when all of the switches are closed. A signal may be incorporated to indicate open condition of the switch circuit. As a result the measuring apparatus will not function until a uniform layer of sand is beneath the plate 18 and will cease to function as soon as the layer drops. Accordingly, except for negligible tailings of the sand accurate measurement is insured.

Before proceeding with a discussion of the theory of operation there will be described several alternative electrical-mechanical systems which may take the place of that illustrated in Figure 1.

Figure 8:
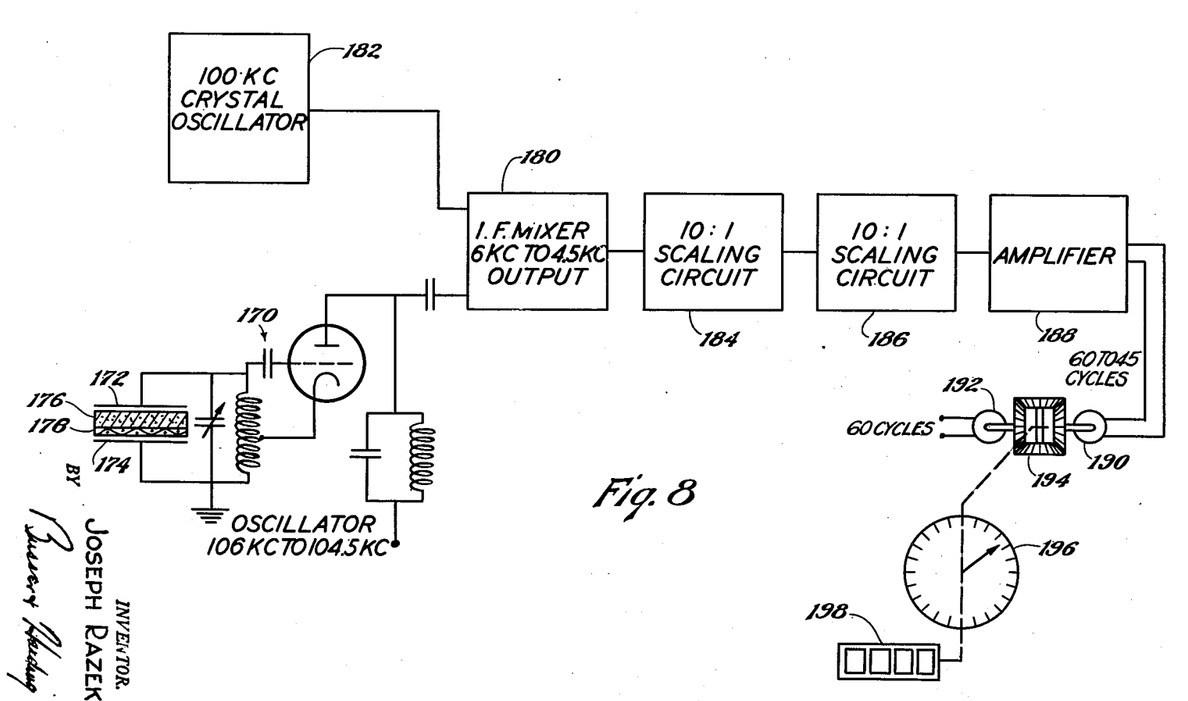
Figure 8 is an electrical-mechanical diagram similar to Figure 1 but illustrating an alternative form of electrical apparatus which may be used.

Figure 8 illustrates a system in which an electron coupled oscillator 170 supplies the load constituted by the upper and lower plates 172 and 174 between which there passes the belt 178 carrying the sand 176. The mechanical arrangement which is involved may be identical with that above described. In this case the variation of load imposed on the oscillator by varying moisture content of the sand produces a change in oscillator frequency. The oscillator is adjusted to operate, for example, at 106 kilocycles for sand containing no free moisture with a continuous variation to 104.5 kilocycles for a free moisture content of 6%. By suitable choice of values of the components of the oscillator the frequency change may be corrected to secure accurate results for changes in density as described hereafter. The output of the oscillator 170 is fed to an intermediate frequency mixer 180 which is also fed by the 100 kilocycle output of a crystal controlled oscillator 182. The mixer, which like the crystal oscillator may be conventional in construction, delivers an output ranging from 6 kilocycles to 4.5 kilocycles depending upon the frequency variations of the oscillator 170. The intermediate frequency is scaled down through a pair of 10:1 scaling circuits 184 and 186 of conventional well-known type with the effect of producing an output having frequencies which are 1/100 of the input frequencies to the scaling circuit, i. e., the output of the scaling circuit has a range of 60 to 45 cycles. This output is amplified by the amplifier 188 to supply driving current to the synchronous motor 190 which together with the synchronous motor 192, normally operating at 60 cycles, drives the differential gear mechanism 194, the output shaft of which drives the dial indicator 196 and the counter 198 in the same fashion as in the modification illustrated in Figure 1.

Figure 9:
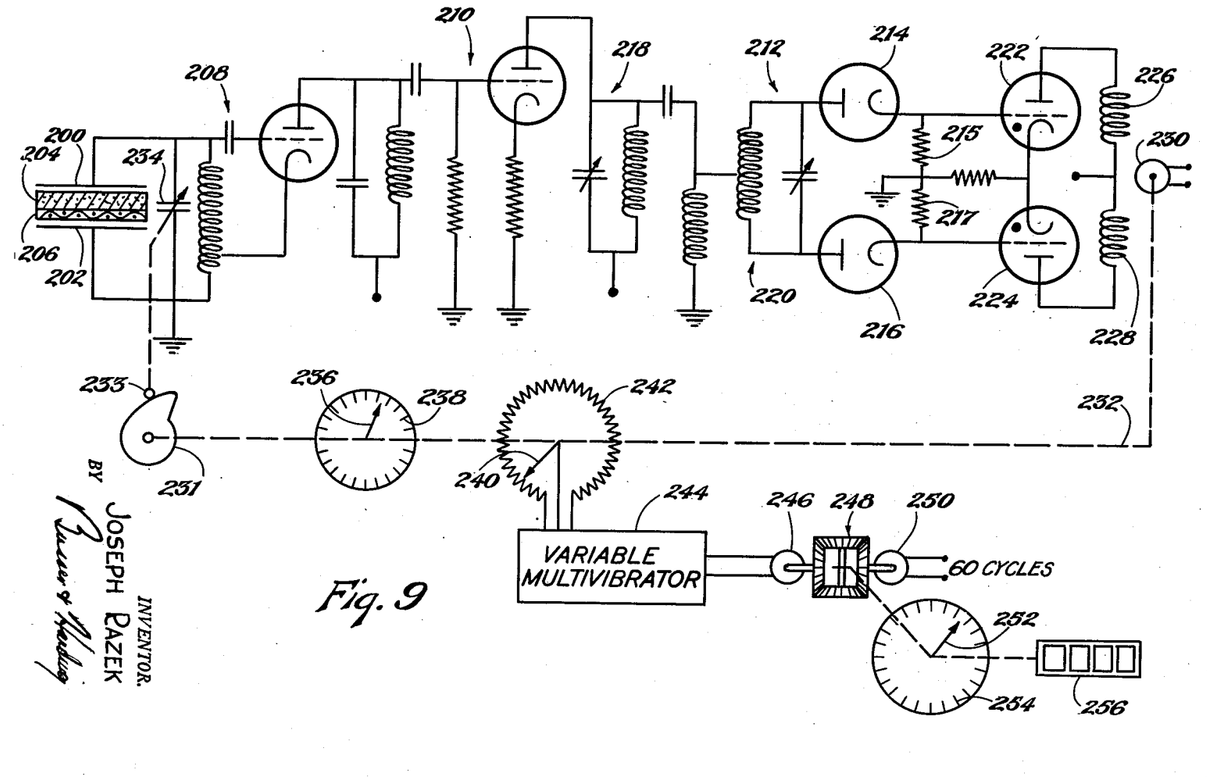
Figures 9 and 10 are electrical-mechanical diagrams showing still further alternatives within the scope of the invention.

Figure 9 illustrates another electrical-mechanical system which may be used. An electron-coupled oscillator 208 similar to that described in connection with Figure 8 is loaded by the system consisting of the plates 200 and 202 and the belt 206 carrying the sand 204. The output of this oscillator is fed through a limiter 210 including a tube operating at saturation and the output of this limiter is fed to a discriminator 212 including the tuned circuits 218 and 220 connected as indicated to each other and to diodes 214 and 216. The diode outputs loaded by the resistors 215 and 217 control the grids of a pair of thyratrons 222 and 224, the anodes of which are supplied with alternating current through the reversing fields 226 and 228 of a direct current motor 230. Depending upon the deviation of frequency of the oscillator above or below a normal frequency one or the other of the tubes 222 or 224 will be conductive to provide selective current flow through the fields 226 and 228 to effect reversal of the motor 230. It may be here remarked that the particular thyratron control of a reversing motor which is here illustrated is to be understood as merely typical of any of the well-known types of control of reversible direct or alternating current motors which may be used. Thyratrons which are selectively arranged to fire depending upon control of their grid conditions may be used to control reversible motors through saturable reactors, variations in transformer loads, or the like and it will be understood that any of these expedients may be equally well used so long as reversal of a motor driven shaft such as 232 may be effected through the control of the thyratron grids.

The shaft 232, which may be driven from the motor shaft through reduction gearing, controls the position of the movable plates of the condenser 234 in the oscillator circuit by the action of a cam 231 carried by the shaft 232 on a follower 233 connected to the movable plates of the condenser. If the frequency of the oscillator rises one of the thyratrons will be caused to fire and produce a rotation of the shaft 232 in such direction as to increase the capacity of the condenser 234 and so decrease the oscillator frequency to normal value. A reverse type of operation occurs if the frequency of the oscillator drops. The position of the shaft 232 is accordingly a measure of the moisture content of the sand. An indicator 236 driven by the shaft 232 may cooperate with a scale 238 to indicate instantaneous values of moisture content of the sand. A potentiometer arm 240 cooperating with a resistance 242 controls the frequency of a multivibrator 244 which may be of the type described in connection with Figure 1 for the production of a variable output frequency to drive the synchronous motor 246 which together with the synchronous motor 250 normally operating at 60 cycles and the differential gear system 248 serves as previously described to drive the pointer 252 cooperating with the dial 254 and also the counter 256 to provide integration of the water content. Except for the mode of control of the variable multivibrator the system of Figure 9 is essentially similar to the system of Figure 1.

In this circuit correction for changes in density are accomplished by suitable shaping of cam 231. Obviously, by such shaping any desired change in frequency of the current to motor 246 may be secured to correspond with change of setting of condenser 234 and consequently with change of moisture content of the sand. The actual shape of the cam may be calculated for particular characteristics of sand or other material being measured.

Figure 1:
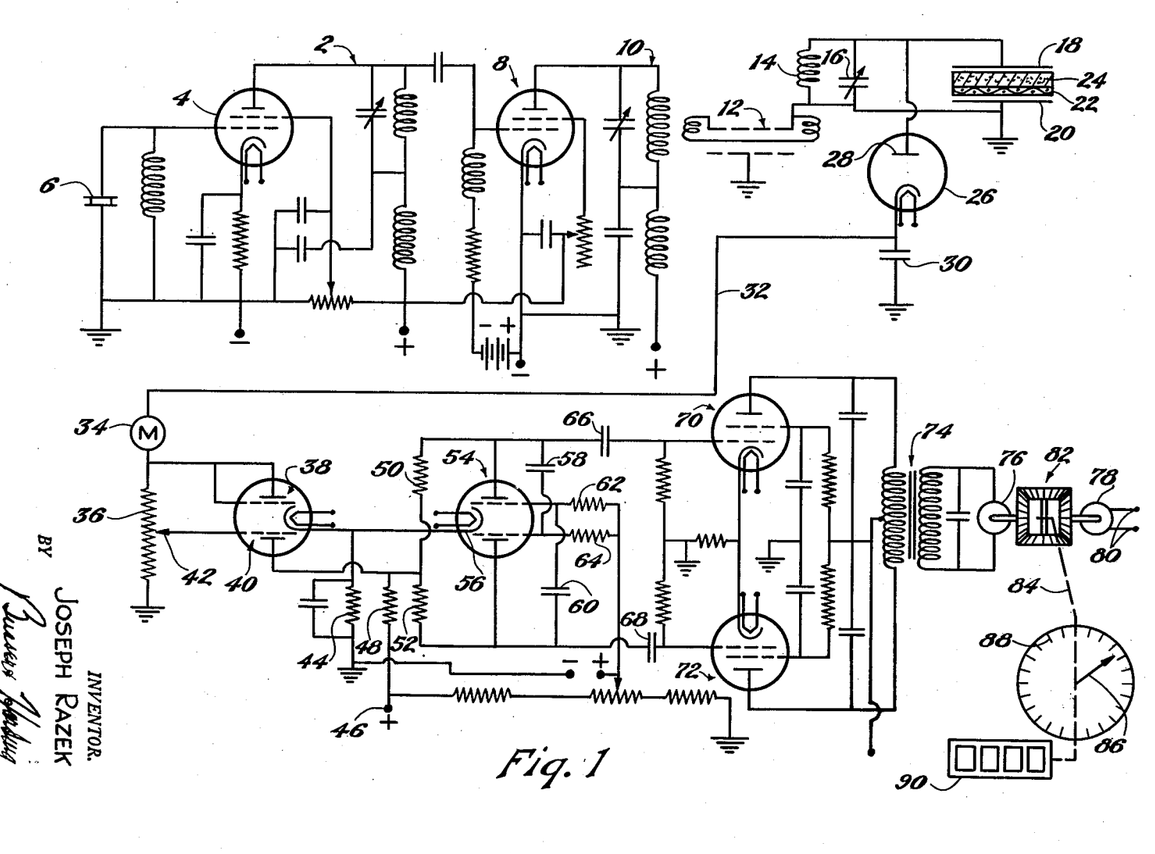
Figure 1 is an electrical-mechanical diagram illustrating a preferred electrical system for the making of measurements of the type indicated above.
Figure 10:
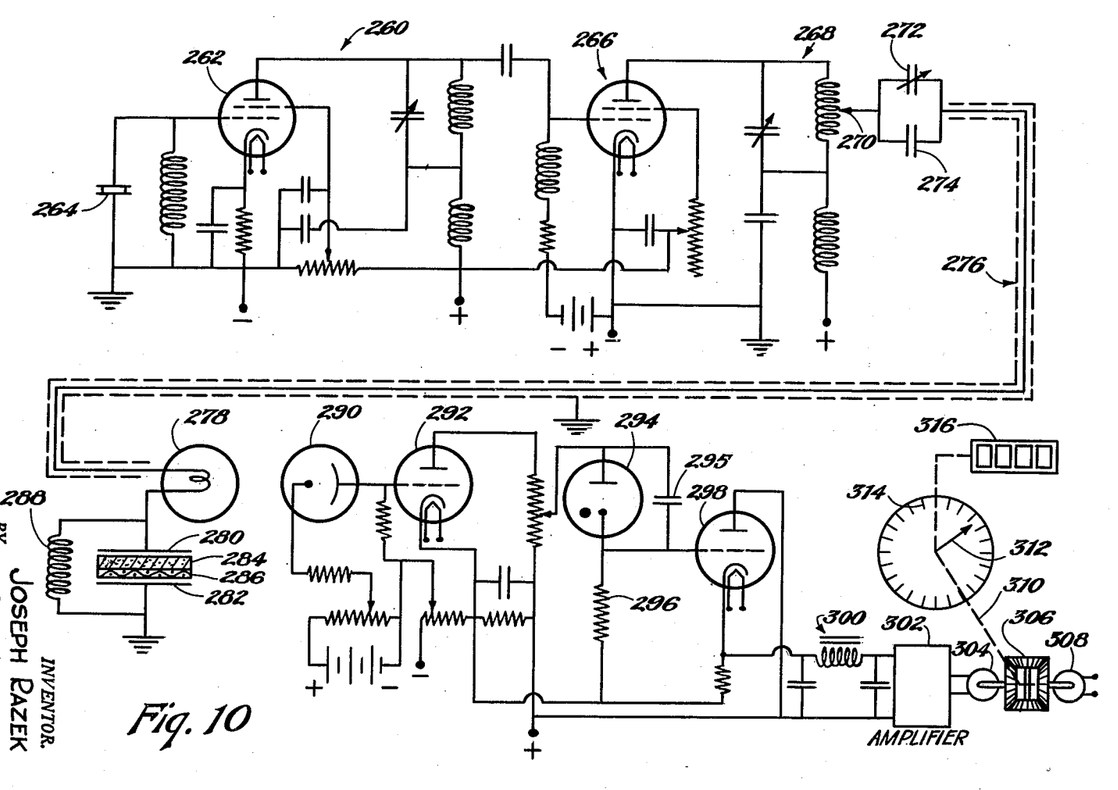

Figure 10 illustrates a further electrical-mechanical system which may be used in place of that illustrated in Figure 1. An oscillator 260 comprising a tube 262 and control crystal 264 feeds a constant high frequency output to an amplifier 266 including the tuned output circuit 268. This oscillator and amplifier may be identical with that illustrated in Figure 1. A coaxial cable 276 is coupled to the coil of the tuned circuit 268 through the variable tap 270 and the fixed and variable condensers 272 and 274 arranged in parallel. The coaxial cable 276 feeds the plates 280 and 282, between which there passes the belt 286 carrying the sand 284, and the coil 288 in parallel with the plates 280 and 282, through a lamp 278. This arrangement is such that the intensity of the illumination of the lamp varies depending upon the load imposed by the moist sand. A measurement of the intensity of the lamp is then accomplished to give the integration of the moisture content. For this purpose a photocell 290 conventionally connected to an amplifier 292 controls the anode potential of a gas-filled tube 294 arranged as a relaxation oscillator in connection with the resistance 296 and condenser 295. This tube may be of any suitable type and conveniently may be a gas-filled voltage regulator tube, though other gas-filled tubes, such as grid glow tubes or hot cathode gas-filled grid controlled tubes, may be used. If grid controlled gas-filled tubes are used the grid may be operated at constant potential or may be subjected to manual potential control for adjustment purposes. The output of the relaxation oscillator, the frequency of which will depend upon the intensity of illumination of the lamp 278, is fed to an amplifier 398 and then through a filter 300 to improve the wave form to approach more nearly sinusoidal form, and an amplifier 302 the output of which drives the synchronous motor 304 which, as in the systems previously described, cooperates with a synchronous motor 308 normally operating at 60 cycles to drive through a differential gear train 306 and output shaft 310, the indicator 312, cooperating with the chart 314, and the counter 316.

The fashion in which the above described methods and apparatus effect quite accurate measure of total moisture content of sand passing through the apparatus between times $t_1$ and $t_2$ will be clear from the following:

Assume $v$ is the linear speed of the belt in feet per second. The apparatus maintains quite closely a constant volume V of delivery of wet sand for each foot length of the belt so that $V = k_1 v$ in which $k_1$ is a constant. The weight W of sand delivered per foot of belt length is $Vd$, in which $d$ is the density which is a function of the percentage by weight, $m$, of moisture. Indicating this functional relationship by $d = \phi(m)$, we have:

(1) $$W = V \cdot \phi(m)$$

The total moisture in the internal $t_1$ to $t_2$ would then be given by the integral $I_R$:

(2) $$I_R = \int_{t_1}^{t_2} mW \cdot dt = \int_{t_1}^{t_2} m \cdot V \cdot \phi(m) \cdot dt = k_1 \int_{t_1}^{t_2} m \cdot \phi(m) \cdot v \cdot dt$$

The velocity of travel, $v$, of the belt may vary slightly with respect to a mean velocity $v_0$, so that $v$ may be written $v = v_0(1+\epsilon)$, in which $\epsilon$ is a small quantity variable with time. The required integral which is to be measured is then:

(3) $$I_R = k_1 v_0 \int_{t_1}^{t_2} m \cdot \phi(m) \cdot dt + k_1 v_0 \int_{t_1}^{t_2} m \cdot \phi(m) \cdot \epsilon \cdot dt$$

Now, the frequency F supplied by the generator 150 is proportional to the belt velocity $v$, and if $F_0$ is the normal frequency corresponding to normal velocity $v_0$, F may be written:

(4) $$F = F_0(1+\epsilon)$$

Let $f$ be the frequency supplied by the electrical systems to the variable speed motors 76, 190, 246, or 304. The integral measured by the registering devices in each case is:

(5) $$I_M = \int_{t_1}^{t_2} (F-f) \cdot dt = \int_{t_1}^{t_2} (F_0-f) \cdot dt + F_0 \int_{t_1}^{t_2} \epsilon \cdot dt$$

In the case of each of expressions (3) and (5) the first of the pairs of integrals is the one of major significance, the latter being merely a correction. Considering the first integrals of the pairs, it will be evident that they may be made equal, first, as to the scale factor, merely by suitable linear calibration of the register, by inserting proper scaling gearing in the shafts 84, etc., or by multiplying the counter readings by a constant factor, and secondly, as to the integrands, by introducing non-linearity into the electrical systems so that $F_0 - f$ is proportional to $m \cdot \phi(m)$. The function $\phi(m)$ is ascertainable for each particular construction or setting of the machine, being dependent upon the degree of compacting effected by roller 136, and the proportionality required may be secured by suitable choice of circuit constants and adjustments. For example, in the case of the circuit of Figure 1, adjustment of the operation characteristic of triode 40 will accomplish the result; in the case of Figure 8 adjustment of the operation of the oscillator 170 will do so; in the case of Figure 9, either non-linear winding of potentiometer 242 or cam drive, as shown, of condenser 234 by shaft 232 will give the proper result; and in the case of Figure 10, adjustment of the photocell amplifier and/or the characteristics of the relaxation oscillator will suffice. As a matter of fact, however, excellent results may be secured merely by approximating the curved relationship by a straight line approximation for the moisture range of interest.

Correspondence between the second integrals of the pairs is a matter of assuming for the actually variable $m \cdot \phi(m)$ an average constant value. Actually with a sufficiently powerful motor 145 of nominally constant speed type, the correction factor $\epsilon$ is very small so that assumption of an average constant value for $m \cdot \phi(m)$ is not a matter introducing substantial error. In fact, the correction $\epsilon$ may usually be disregarded altogether, in which case generator 150 may be omitted and the synchronous motors 78, 192, 250 and 308 may be operated from a well regulated commercial sixty cycle supply.

What I claim and desire to protect by Letters Patent is:

1. Apparatus for the measurement of moisture content of large quantities of granular material comprising means responsive to the moisture content of a small quantity of such material in a measuring zone, means for conveying the material through said zone, means for controlling the amount of granular material in said zone, and means for integrating the responses of the first mentioned means to give approximately the total moisture content of a large quantity of material passing through said zone.

2. Apparatus for the measurement of moisture content of large quantities of granular material comprising means responsive to the moisture content of a small quantity of such material in a measuring zone, means for conveying the material through said zone at an approximately constant volumetric rate, and means for indicating the time integral of the responses of the first mentioned means to give approximately the total moisture content of a large quantity of material passing through said zone.

3. Apparatus for the measurement of moisture content of large quantities of granular material comprising means responsive to the moisture content of a small quantity of such material in a measuring zone and giving rise to an alternating electrical current having a frequency differing from a standard frequency substantially in proportion to the moisture content of the material in said zone, means for conveying the material through said zone at an approximately constant volumetric rate, and means for integrating said frequency difference with respect to time as an approximate measure of the total moisture content of a large quantity of material passing through said zone.

4. Apparatus for the measurement of moisture content of large quantities of granular material comprising means responsive to the moisture content of a small quantity of such material in a measuring zone and giving rise to an alternating electrical current having a frequency differing from a standard frequency substantially in proportion to the moisture content of the material in said zone, means for conveying the material through said zone at an approximately constant volumetric rate, a motor driven by said current at a speed substantially proportional to said frequency, a second motor driving at a substantially constant speed, and differential mechanism driven by both of said motors and providing a response substantially proportional to the difference of the motor displacements as an approximate measure of the total moisture content of a large quantity of material passing through said zone.

5. Apparatus for the measurement of moisture content of large quantities of granular material comprising means responsive to the moisture content of a small quantity of such material in a measuring zone and giving rise to an alternating electrical current having a frequency differing from a standard frequency substantially in proportion to the moisture content of the material in said zone, means for conveying the material through said zone, a motor driven by said current at a speed substantially proportional to said frequency, a second motor driving at a speed proportional to the volumetric rate of movement of the material in its progress through said zone, and differential mechanism driven by both of said motors and providing a response substantially proportional to the difference of the motor displacements as an approximate measure of the total moisture content of a large quantity of material passing through said zone.

6. Apparatus for the measurement of moisture content of large quantities of granular material comprising means responsive to the moisture content of a small quantity of such material in a measuring zone and giving rise to an alternating electrical current having a frequency differing from a standard frequency substantially in proportion to the moisture content of the material in said zone, means for conveying the material through said zone at an approximately constant volumetric rate, a motor driven by said current at a speed substantially proportional to said frequency, a second motor driving at a speed proportional to the volumetric rate of movement of the material in its progress through said zone, and differential mechanism driven by both of said motors and providing a response substantially proportional to the difference of the motor displacements as an approximate measure of the total moisture content of a large quantity of material passing through said zone.

7. Apparatus for the measurement of moisture content of large quantities of granular material comprising means inducing high frequency currents in small quantities of such material in a measuring zone, means responsive to the high frequency properties of the material in said zone, means for conveying the material through said zone, means for controlling the amount of granular material in said zone, and means for integrating the responses of the second mentioned means to give approximately the total moisture content of a large quantity of material passing through said zone.

8. Apparatus for the measurement of moisture content of large quantities of granular material comprising means inducing high frequency currents in small quantities of such material in a measuring zone, means responsive to the high frequency properties of the material in said zone, means for conveying the material through said zone at an approximately constant volumetric rate, and means for indicating the time integral of the responses of the second mentioned means to give approximately the total moisture content of a large quantity of material passing through said zone.

9. Apparatus for the measurement of moisture content of large quantities of granular material comprising means inducing high frequency currents in small quantities of such material in a measuring zone and giving responses functionally related to the moisture content of the material in said zone, means for conveying the material through said zone, means for controlling the amount of granular material in said zone, and means for integrating the responses of the first mentioned means to give approximately the total moisture content of a large quantity of material passing through said zone.

10. Apparatus for the measurement of moisture content of large quantities of granular material comprising a high frequency generator for inducing high frequency currents in small quantities of such material in a measuring zone, said generator being of a variable frequency type, the frequency of which is dependent upon the load imposed thereon by said material, means automatically adjustable to maintain the generator frequency substantially constant and giving responses functionally related to the moisture content of the material in said zone, means for conveying the material through said zone, and means for integrating the responses of the first mentioned means to give approximately the total moisture content of a large quantity of material passing through said zone.

11. Apparatus for the measurement of moisture content of granular material passing through a measuring zone comprising means responsive to the moisture content of material in said zone, a conveyor belt for conveying the material through said zone, means for feeding material to said belt to provide an approximately constant volumetric rate of flow of the material through said zone, and means for compacting the material on said belt to a predetermined depth thereon prior to its passage through said zone.

12. Apparatus for the measurement of moisture content of granular material passing through a measuring zone comprising means responsive to the moisture content of material in said zone, a conveyor belt for conveying the material through said zone, means for feeding material to said belt to provide an approximately constant volumetric rate of flow of the material through said zone, and fluffing means for said material preceding said feeding means to put said material into a substantially predetermined condition.

13. Apparatus for the measurement of moisture content of large quantities of granular material comprising means responsive to the moisture content of a small quantity of such material in a measuring zone, means for conveying the material through said zone, means providing uniformity of material conveyed through said zone and an approximately constant volumetric rate of progress through said zone, and means for integrating the responses of the first mentioned means to give approximately the total moisture content of a large quantity of material passing through said zone.

14. The method of measuring the moisture content of large quantities of granular material comprising progressing said material through a measuring zone at an approximately constant volumetric rate, measuring the moisture content of the material momentarily in said zone, and integrating with respect to time said measurements to obtain the approximate total moisture content of the total material progressed through said zone.

15. The method of measuring the moisture content of large quantities of granular material comprising progressing said material through a measuring zone at an approximately constant volumetric rate, inducing high frequency currents in the material momentarily in said zone, measuring the moisture content of the material momentarily in said zone as a function of power absorption due to said induced high frequency currents, and integrating with respect to time said measurements to obtain the approximate total moisture content of the total material progressed through said zone.

16. The method of measuring the moisture content of granular material comprising fluffing said material to break up aggregates thereof, delivering the fluffed material to a conveyor belt to provide a layer of the material thereon of substantially constant thickness, compacting said layer to a definite thickness on the belt, progressing the compacted material on the belt through a measuring zone, and measuring the moisture content of the material momentarily in said zone.

17. The method of measuring the moisture content of large quantities of granular material comprising fluffing said material to break up aggregates thereof, delivering the fluffed material to a conveyor belt to provide a layer of the material thereon of substantially constant thickness, compacting said layer to a definite thickness on the belt, progressing the compacted material on the belt through a measuring zone at an approximately constant volumetric rate, measuring the moisture content of the material momentarily in said zone, and integrating with respect to time said measurements to obtain the approximate total moisture content of the total material progressed through said zone.

18. The method of measuring the moisture content of large quantities of granular material comprising delivering the material to a conveyor belt to provide a layer of the material thereon of substantially constant thickness, compacting said layer to a definite thickness on the belt, progressing the compacted material on the belt through a measuring zone at an approximately constant volumetric rate, measuring the moisture content of the material momentarily in said zone, and integrating with respect to time said measurements to obtain the approximate total moisture content of the total material progressed through said zone.

19. The method of measuring the moisture content of large quantities of granular material comprising fluffing said material to break up aggregates thereof, delivering the fluffed material to a conveyor belt to provide a layer of the material thereon of substantially constant thickness, compacting said layer to a definite thickness on the belt, progressing the compacted material on the belt through a measuring zone at approximately constant volumetric rate, measuring the moisture content of the material momentarily in said zone, and integrating with respect to time said measurements to obtain the approximate total moisture content of the total material progressed through said zone.

20. The method of measuring the moisture content of large quantities of granular material comprising delivering the material to a conveyor belt to provide a layer of the material thereon of substantially constant thickness, compacting said layer to a definite thickness on the belt, progressing the compacted material on the belt through a measuring zone at approximately constant volumetric rate, measuring the moisture content of the material momentarily in said zone, and integrating with respect to time said measurements to obtain the approximate total moisture content of the total material progressed through said zone.

21. Apparatus for the measurement of moisture content of large quantities of granular material comprising means responsive to the moisture content of a small quantity of such material in a measuring zone, means for conveying the material through said zone, means for controlling the amount of granular material in said zone, and means for indicating the integral of the responses of the first mentioned means with respect to the volumetric displacement of the material through said zone to give approximately the total moisture content of a large quantity of material passing through said zone.

22. Apparatus for the measurement of moisture content of large quantities of granular material comprising means inducing high frequency currents in small quantities of such material in a measuring zone, means responsive to the high frequency properties of the material in said zone, means for conveying the material through said zone, means for controlling the amount of granular material in said zone, and means for indicating the integral of the responses of the second mentioned means with respect to the volumetric displacement of the material through said zone to give approximately the total moisture content of a large quantity of material passing through said zone.

23. Apparatus for the measurement of moisture content of large quantities of granular material comprising a high frequency generator for inducing high frequency currents in small quantities of such material in a measuring zone, said generator being of a variable frequency type, the frequency of which is dependent upon the load imposed thereon by said material, means automatically adjustable to maintain the generator frequency substantially constant and giving responses functionally related to the moisture content of the material in said zone, means for conveying the material through said zone, and means for indicating the integral of the responses of the first mentioned means with respect to the volumetric displacement of the material through said zone to give approximately the total moisture content of a large quantity of material passing through said zone.

JOSEPH RAZEK.

REFERENCES CITED

The following references are of record in the file of this patent:

UNITED STATES PATENTS

| Number | Name | Date |
|---|---|---|
| 706,554 | Hall | Aug. 12, 1902 |
| 1,800,640 | Jehle et al. | Apr. 14, 1931 |
| 1,842,160 | Ford | Jan. 19, 1932 |
| 1,878,109 | Clark | Sept. 20, 1932 |
| 1,878,658 | Aronoff | Sept. 29, 1932 |
| 2,200,431 | Rateau | May 14, 1940 |
| 2,200,863 | Schuck | May 14, 1940 |
| 2,357,860 | Whitaker | Sept. 12, 1944 |
| 2,371,626 | Kecskemeti | Mar. 20, 1945 |
| 2,382,168 | Oxley et al. | Aug. 14, 1945 |
| 2,387,496 | Cornelius | Oct. 23, 1945 |
| 2,414,086 | Brewer | Jan. 14, 1947 |
| 2,422,742 | Odessey | June 24, 1947 |
| 2,508,045 | Seney | May 16, 1950 |

FOREIGN PATENTS

| Number | Country | Date |
|---|---|---|
| 724,043 | Germany | Aug. 17, 1942 |